Oct. 26, 1965     L. E. BORELL     3,213,564
FISHING TACKLE KEEPER
Filed Dec. 13, 1963
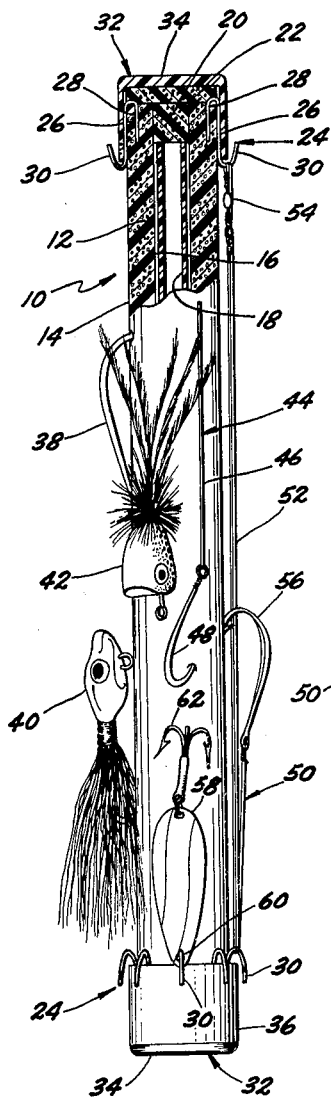
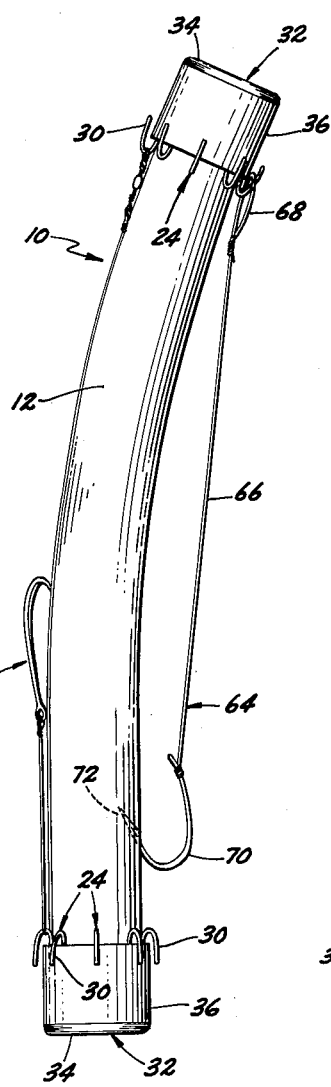
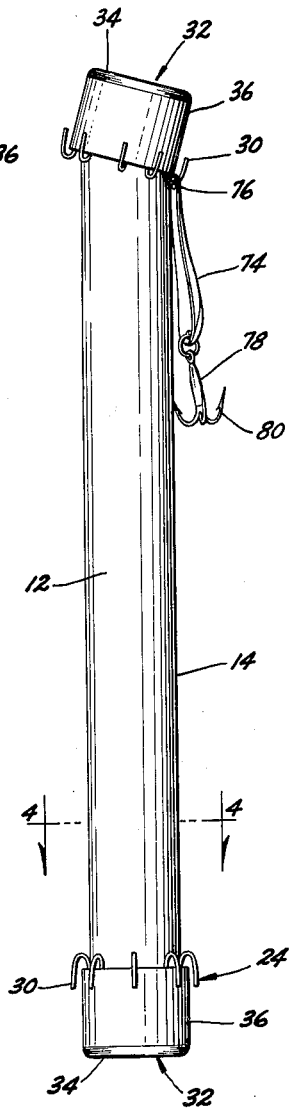
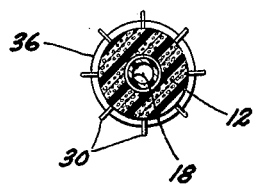
INVENTOR.
LOUIS E. BORELL
BY
Meyers & Peterson
ATTORNEYS 3,213,564
FISHING TACKLE KEEPER
Louis E. Borell, 819 7th St., Farmington, Minn.
Filed Dec. 13, 1963, Ser. No. 330,308
11 Claims. (Cl. 43—57.5)

This invention relates generally to a fishing tackle keeper for use by fishermen to store snelled hooks, lures of various types, spoons and similar items having barbed hooks thereon.

As one might expect, various mechanical contrivances have been devised for the accommodation of fish hooks and other tackle equipment. Some of these have been in the form of containers or receptacles; some have included different types of springs for holding leaders taut, and still others have involved arrangements requiring that the leaders be wrapped around a portion of the device.

While some of the prior art devices serve their respective designated purposes quite well, any given prior art device will not possess all of the desired attributes. Others, of course, have shortcomings that simply have not been met with heretofore. Hence, the present invention has for a general object the provision of a fishing tackle keeper that has a number of distinct advantages, thereby rendering it much more attractive to the user because of its greater versatility than the devices with which I am acquainted.

More specifically, the invention has for an object a fishing tackle keeper capable of accommodating various fishing gear having different lengths. In this regard, the invention has for an aim the provision of a keeper that will permit the firm retention of numerous tackle items. For instance, where a leader is relatively long, it is within the contemplation that the leader be doubled back on itself any number of times in order to assure that there is no slack left.

Another object of the invention is to provide a fishing tackle keeper that facilitates the maintaining of a neat and orderly tackle box without the concomitant mess heretofore normally foud amongst fishermen. Stated somewhat differently, the present invention enables a fisherman to practice good "housekeeping" techniques without going to any additional trouble or without spending any additional time. As a matter of fact, it is within the purview of the invention to reduce the over-all amount of time that the fisherman spends in conjunction with his tackle, for the tackle will never become tangled, thereby requiring an undue amount of time to separate the items from each other.

Another object of the invention is to provide a fishing tackle keeper that will not be affected by corrosive conditions. In other words, it is within the scope of the invention to utilize materials, including the various hook members, that will not corrode even when exposed to various types of weather and also a salt water atmosphere.

Still another object of the invention is to provide a keeper of the foregoing character that will float if inadvertently dropped into the water from a dock or boat. Thus, it is easy to retrieve a fishing tackle keeper constructed in accordance with the present invention.

Another object of the invention is to provide a fishing tackle keeper that will not roll about once the tackle has been placed thereon. It is within the framework of the invention to provide a cylindrical keeper, this being the type most easily fabricated, but with the tackle impaled thereon there is no real likelihood that the keeper will roll and become lost or fall overboard from a boat.

Yet another object of the invention is to provide a keeper that will be quite attractive as far as its appearance is concerned and also one that can be produced at a relatively low cost.

Still further, a feature of the invention resides in the ease with which the various tackle items can be attached and also the facility with which they can be removed when they are to be used.

These and other objects and advantages of my invention will more fully appear from the following description, made in connection with the accompanying drawing, wherein like reference characters refer to the same or similar parts throughout the several views and in which:

FIGURE 1 is an elevational view of one form my fishing tackle keeper can assume, a portion of the outer tube having been removed to show to better advantage the keeper's internal construction;

FIGURE 2 is a view of the keeper in a flexed condition for attaching a relatively long tackle item;

FIGURE 3 is a view of the keeper in a flexed condition for attaching a relatively short tackle item, and FIGURE 4 is a sectional view taken in the direction of line 4—4 of FIGURE 3.

Referring now in detail to the drawing, my fishing tackle keeper has been denoted generally by the reference numeral 10. In the illustrated situation, the keeper is comprised of an outer tube 12 of foamed polyethylene having an exterior surface that is easily penetratable by the barb of a fish hook. The tube 12 is readily extruded and in the extrusion process, an interior longitudinal bore 16 is formed. In this way, the tube 12 is quite resilient and can be considered as having a relatively low density compared to an inner tube 18. The inner tube 18 is preferably of cellulose acetate and is considerably more dense than tube 12. The acetate composition imparts an appreciable amount of "springiness" to the keeper 10 so that it returns to the straight line configuration of FIGURE 1 or substantially to this position. Even so, the inner tube 18 possesses a considerable amount of flexibility as will be hereinafter understood. Stated in a slightly different way, it will be appreciated that the outer tube 12 is of a foamed material, whereas the inner tube 18 is of a non-foamed material.

As can be descerned from FIGURE 1, the inner tube 18 does not extend completely to the upper end of the outer tube 12, nor does its lower end extend to the lower end of said tube 12. This is done for a purpose presently to be made manifest, but at this particular point, it can be explained that a plug 20 is located at each end, the upper plug being clearly visible by reason of the portion of the outer tube that has been broken away. The plug is preferably of the same foamed plastic material as the outer tube 12. Also preferably of this same material is a disc 22 which overlies the upper end of the plug 20 as shown in FIGURE 1. It will be understood, though, that a similar plug 20 is utilized at the bottom and a similar disc 22 is also employed. If desired, the plug and disc can be of a single unit.

At this time, attention is directed to two sets of hook elements 24. Each hook element 24 is formed with a shank 26 having a hook end 28 that is reversely bent so as to be easily embedded into the outer sleeve 12. Carried at the opposite end of the shank 26 in each instance is a hook end 30 that diverges outwardly somewhat. It will be recognized, it is believed, that the various hook elements 24 are anchored in place prior to the application of the disc 22 to each end.

Disposed at each end of the outer tube 12 is a cap or cup-shaped element 32, also of polyethylene, having a flat base 34 and a cylindrical side wall 36. Since polyethylene is easily fused, it is planned that the plug 20 and the disc 22 be secured by partially melting the plastic and in this way creating a bond between the elements 20, 22 and the outer tube 12. Similarly, the outer surface of the tube 12 adjacent each end thereof can be fused or partially melted so as to create a bond between the cylindrical side wall 36 of each element 32.

It has already been mentioned that foamed polyethylene serves as a material that is readily penetratable by the barbs of fish hooks. Consequently, it can now be appreciated that a single fish hook, such as that shown at 38, can be retained in place by only forcing the prong or barb thereon through the exterior surface 14 into the body of the tube 12. Similarly, the lures 40, 42 can have their hooks impaled into the tube 12, the foamed material readily receiving the barbs or prongs thereof. These items are clearly pictured in FIGURE 1.

The invention has particular utility in connection with snelled hooks and one such hook has been labeled 44, having a relatively short snell or leader 46 to which is attached a hook 48. Similarly, a second snelled hook 50 having a relatively long snell 52, a swivel 54 at one end thereof and a fish hook 56 at the other end thereof is also held by the keeper 10. It will be observed though, that the snell 52 is entrained about one hook element 24 at the top and one hook element 24 at the bottom, more specifically the hook ends 30 thereof. More will be said shortly concerning the manner in which a snelled hook, such as the one denoted by the reference numeral 50, is attached to the keeper 10.

Attention is called to the fact that a spoon 58 can also be accommodated, such a spoon having been pictured in FIGURE 1. Conventionally, the spoon 58 includes a hole 60 at one end and a fish hook 62 at the other end. The hole 60 easily receives the hook end 30 of one of the hook elements 24.

The foregoing description of the items retained in place on the fishing tackle keeper 10 shown in FIGURE 1 demonstrates the versatility of the device exemplifying the present invention. While a representative number of items have been illustrated in FIGURE 1, it should be appreciated that still other items, whether like those shown or of a different configuration, can be accommodated, for a considerable amount of space still remains should it be needed.

With reference now to FIGURE 2, a specific mode of attaching the tackle items there shown will be described. First, it will be seen that a snelled hook 64, generally resembling the snelled hook 44, has a snell 66 that is somewhat shorter than the length of the keeper 10. More specifically, the snell 66 has a loop 68 at one end, which is customary, and this is utilized for engaging one of the hook elements 24 at the upper end, more specifically the hook end 30 of such element. The other end of the snell 66 has a hook 70 attached thereto having a barb 72 which is easily embedded into the foamed polyethylene consitituting the outer tube 12. The snelled hook 64 is actually in the process of being attached, for the keeper 10 is flexed to whatever extent is necessary to firmly embed the barb 72. Once the barb 72 has entered through the exterior surface 14, release of the upper end of the keeper will permit the keeper to spring back to substantially its original straight-line position, this being the position shown in FIGURE 1. In other words, all that the fisherman need do is to bend the keeper 10 into an arcuate configuration, and when so bent or flexed cause the barb 72 to penetrate the exterior surface 14. Subsequent release will cause the entire snelled hook 64 to be retained in place.

Compared to the snelled hook 64, the snelled hook 50 is considerably longer as far as its snell 52 is concerned. Hence, it is within the contemplation of the invention to have the snell 52 wrapped or entrained about the hook ends 30 of two oppositely positioned hook elements 24 to whatever extent is needed. Thus, the swivel 54 can be applied to the hook end 30 at the top and the snell 52 can be extended downwardly and then about the lowermost hook end 30 that is in vertical alignment therewith, the hook 56 then being brought up and permitted to penetrate the exterior surface 14 of the tube 12. This is done by flexing or bending the keeper in an opposite direction from that in which it has been presented in FIGURE 2.

Prior reference has been made to the spoon 58. A similar spoon 74 has been shown in FIGURE 3, this spoon having a hole 76 and a hook 78 with a plurality of barbs 80 thereon. Owing to the lower density of the foamed polyethylene, the presence of the plug 20 at each end plus the existence of the disc 22 at each end, permits a more ready deflection of the end portions of the keeper 10. FIGURE 3 shows quite clearly how the upper end can be easily flexed or bent without causing the inner tube 18 to bend. Stated somewhat differently, the upper end portion shown in FIGURE 3 is merely rocked or cocked sufficiently so as to permit impalement of one of the barbs 80 into the outer tube 12. This is done without very much manual effort. However, if one were compelled to bend any portion of the keeper into which extends the inner tube 18, then considerable effort would have to be made to provide enough bending so that the spoon 74 could be attached. Release of the upper end will cause it to assume its normal position, the release permitting the particular barb 80 to be more firmly impaled into the outer tube 12. If need be, a slight amount of manual pressure can be applied so as to return the upper end to the position in which it appears in FIGURE 1. Actually, the spoon 58 in FIGURE 1 is shown at the lower end thereof, but this is for the purpose of illustrating that either end of the keeper 10 can be flexed in order to accommodate a spoon or some other short tackle item.

By way of review, it will be evident that two distinct types of bending are possible with my fishing tackle keeper 10. One of these types of bending or flexing is depicted in FIGURE 2. This type of bending action is desired each time that a tackle item of considerable length is to be attached. On the other hand, the second type of bending is shown in FIGURE 3, this being resorted to where relatively short items are to be attached at one end to a hook element 24 and which has a hook thereon which is only a short distance from the end thereof which is to be anchored to a hook element 24. Since in the exemplary embodiment there is provided a section of foamed plastic material at each end which resides above and below the ends of the inner tube 18, still a third way of attaching tackle to the keeper 10 exists, this being by merely compressing the ends of the keeper rather than deflecting same. In other words it is feasible to manually press the ends toward each other when the tackle is to be applied, subsequent release and the concomitant expansion assuring retention in this instance.

It will, of course, be understood that various changes may be made in the form, details, arrangements and proportions of the parts without departing from the scope of my invention as set forth in the appended claims.

What is claimed is:
1. A fishing tackle keeper comprising:
(a) an outer elongated tube of foamed plastic material;
(b) an inner elongated resilient tube of a denser plastic material than said outer tube for assisting said outer tube in the return to a substantially straight configuration after being flexed into an arcuate configuration;
(c) a cup-shaped element at each end of said outer tube into which that particular end of said outer tube is received, and
(d) a plurality of hook elements spaced angularly about the periphery of each cup-shaped element.
2. A fishing tackle keeper in accordance with claim 1 in which:
(a) said inner tube is shorter than said outer tube.
3. A fishing tackle keeper in accordance with claim 2 including:
(a) a spacer means between each end of said inner tube and the cup-shaped element nearer thereto.

4. A fishing tackle keeper in accordance with claim 3 in which:
   (a) said respective spacer means are also of foamed plastic material.

5. A fishing tackle keeper in accordance with claim 1 in which:
   (a) said outer tube is of foamed polyethylene, and
   (b) said inner tube is of cellulose acetate.

6. A fishing tackle keeper in accordance with claim 1 in which:
   (a) each hook element has a shank portion extending generally parallel to the outer surface of the cup-shaped element with which it is associated.

7. A fishing tackle keeper comprising:
   (a) an elongated resilient tube of foamed plastic material;
   (b) a second tube of a denser material contained within said first tube,
   (c) said second tube being shorter than the first tube so as to permit one end of said first tube to be compressed toward its other end, and
   (d) a plurality of angularly spaced hook elements fixedly anchored adjacent said other end,
   (e) whereby a fish hook may have one end connected with one of said hook elements and the barbed end engaged with said foamed plastic material to hold said fish hook taut.

8. A fishing tackle keeper comprising:
   (a) an elongated member of foamed plastic material having an outer surface for receiving the barb of a fish hook at a location therealong;
   (b) a cup-shaped element telescoped over one end of said elongated member, and
   (c) a plurality of angularly spaced hook elements fixedly associated with said cup-shaped element,
   (d) said elongated member being sufficiently resilient so that the ends thereof can be manually compressed closer together for the purpose of impaling the barb of a fish hook when the other end of the fish hook is connected to one of said hook elements.

9. A fishing tackle keeper in accordance with claim 8 in which:
   (a) there is a second cup-shaped element telescoped over the other end of said elongated member, and
   (b) a second plurality of angularly spaced hook elements fixedly associated with said second cup-shaped element.

10. A fishing tackle keeper comprising:
    (a) an elongated resilient tubular member of foamed material and of sufficient flexibility so as to allow one end thereof to be transversely flexed in any angular direction with respect to the other end and thereby cause said elongated member to assume various arcuate configurations,
    (b) said elongated resilient member having an outer yielding surface for receiving the barb of a fish hook at a location therealong,
    (c) a plurality of angularly spaced hook elements fixedly anchored adjacent said other end, and
    (d) a second elongated member of lesser resiliency contained within said first elongated member for assisting in the return of said first member from an arcuate configuration into which it has been flexed back to a substantially straight configuration.

11. A fishing tackle keeper in accordance with claim 10 in which:
    (a) said second elongated member is also tubular.

References Cited by the Examiner
UNITED STATES PATENTS

| | | | |
|---|---|---|---|
| 657,786 | 9/00 | Plumley | 43—57.5 |
| 2,789,389 | 4/57 | Moen | 43—57.5 |
| 2,879,619 | 3/59 | Peterson | 43—57.5 |

OTHER REFERENCES
Popular Mechanics, Volume 83, page 98 June 1945.

ABRAHAM G. STONE, *Primary Examiner*.